(12) United States Patent
Kitta et al.

(10) Patent No.: US 11,165,302 B2
(45) Date of Patent: Nov. 2, 2021

(54) ROTATING ELECTRICAL MACHINE

(71) Applicant: Mitsubishi Electric Corporation, Tokyo (JP)

(72) Inventors: Yoshiaki Kitta, Tokyo (JP); Ken Nishikawa, Tokyo (JP); Yoshiki Kuwahara, Tokyo (JP); Fumitaka Totsuka, Tokyo (JP); Yutaka Ikura, Tokyo (JP); Koichi Ojima, Tokyo (JP); Masaya Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/319,532

(22) PCT Filed: Nov. 11, 2016

(86) PCT No.: PCT/JP2016/083516
§ 371 (c)(1),
(2) Date: Jan. 22, 2019

(87) PCT Pub. No.: WO2018/087882
PCT Pub. Date: May 17, 2018

(65) Prior Publication Data
US 2020/0212752 A1    Jul. 2, 2020

(51) Int. Cl.
*H02K 3/50* (2006.01)
*H02K 1/18* (2006.01)
(Continued)

(52) U.S. Cl.
CPC .......... *H02K 3/50* (2013.01); *H02K 1/18* (2013.01); *H02K 1/20* (2013.01); *H02K 3/28* (2013.01); *H02K 5/10* (2013.01); *H02K 11/0094* (2013.01)

(58) Field of Classification Search
None
See application file for complete search history.

(56) References Cited

U.S. PATENT DOCUMENTS 7,795,767 B2 * 9/2010 Ueta .................. H02K 3/522
310/71
9,742,234 B2 * 8/2017 Hashimoto ............. H02K 3/50
(Continued)

FOREIGN PATENT DOCUMENTS

CN        104426278 A      3/2015
JP        2002-125348 A    4/2002
(Continued)

OTHER PUBLICATIONS

International Search Report for PCT/JP2016/083516, dated Dec. 13, 2016.
(Continued)

*Primary Examiner* — Quyen P Leung
*Assistant Examiner* — Minki Chang
(74) *Attorney, Agent, or Firm* — Sughrue Mion, PLLC; Richard C. Turner

(57) ABSTRACT

A rotating electrical machine includes a rotor; a stator having a core annularly arranged facing the outer peripheral surface of the rotor, a coil wound around the core and having a coil end formed protruding from an end surface in the axial direction of the core, and an insulator formed on the end surface in the axial direction of the core and insulating the core and the coil; a bus bar arranged on the outer peripheral side of the coil end of the stator; and a terminal block installed on the outer peripheral side of the bus bar for introducing an electric current from an external power source to the stator, and the insulator has a groove portion in which the bus bar is held, and a terminal block housing portion in which the terminal block is held.

12 Claims, 6 Drawing Sheets

(51) Int. Cl.
*H02K 1/20* (2006.01)
*H02K 3/28* (2006.01)
*H02K 5/10* (2006.01)
*H02K 11/00* (2016.01)

(56) References Cited

U.S. PATENT DOCUMENTS

| | | | | |
|---|---|---|---|---|
| 2002/0043883 A1* | 4/2002 | Shimizu | ............... | H02K 5/225 310/71 |
| 2003/0090166 A1* | 5/2003 | Kobayashi | ............ | H02K 3/522 310/144 |
| 2011/0115316 A1 | 5/2011 | Isogai et al. | | |
| 2012/0313460 A1* | 12/2012 | Schaflein | ............... | H02K 5/225 310/43 |
| 2014/0230593 A1* | 8/2014 | Takagi | ................ | B60K 6/405 74/468 |
| 2015/0061431 A1* | 3/2015 | Egami | ................. | H02K 3/522 310/71 |
| 2018/0316236 A1 | 11/2018 | Ikura | | |

FOREIGN PATENT DOCUMENTS

| | | | |
|---|---|---|---|
| JP | 2006-067799 | A | 3/2006 |
| JP | 2008-312277 | A | 12/2008 |
| JP | 2009-247061 | A | 10/2009 |
| JP | 2011-109839 | A | 6/2011 |
| JP | 4876568 | B2 | 2/2012 |
| JP | 2012-110082 | A | 6/2012 |
| JP | 2012-170172 | A | 9/2012 |
| JP | 2016-015885 | A | 1/2016 |
| WO | 2016/162920 | A1 | 10/2016 |

OTHER PUBLICATIONS

Communication dated Dec. 24, 2019 from Japanese Patent Office in counterpart JP Application No. 2018-549714.
Japanese Office Action dated Jun. 30, 2020 in Patent Application No. 2018-549714.
Chinese Office Action dated Jun. 2, 2020 in Patent Application No. 201680090536.4.
Office Action dated Dec. 22, 2020 from the China National Intellectual Property Administration in CN Patent Application No. 201680090536.4.

* cited by examiner

ROTATING ELECTRICAL MACHINE

CROSS REFERENCE TO RELATED APPLICATIONS

This Application is a National Stage of International Application No. PCT/JP2016/083516 filed Nov. 11, 2016.

TECHNICAL FIELD

The present invention relates to a rotating electrical machine, for example, a rotating electrical machine mounted on a vehicle, etc.

BACKGROUND ART

Conventionally, an external connection terminal block of a rotating electrical machine is usually arranged in an outer side in the axial direction of the rotating electrical machine because a power supply portion supplying power to the coil is positioned at an end portion in the axial direction of the rotating electrical machine (for example, see Patent Literature 1).

In addition, in order to install an external connection cable in an arbitrary direction for reasons such as improvement of assemblability, a terminal block as a separate structure to convert bolt fastening direction is used (for example, see Patent Literatures 2 and 3).

A rotating electrical machine having these characteristics is configured to be arranged being sandwiched between power transmission paths in a vehicle and the like for HEV (Hybrid Electric vehicle) (for example, see Patent Literatures 4 and 5).

The following technical problems can be raised when the rotating electrical machine is arranged at a position sandwiched between power transmission paths. First, (1) since structures such as as engine and a transmission are arranged at both ends in the axial direction of the rotating electrical machine, there is a problem that space in the axial direction is limited.

Secondly, (2) there is the ground under the rotating electrical machine, and in FR vehicles in particular, there is a cabin floor or the like above the rotating electrical machine, and thus there is a problem that space in the radial direction is also limited.

CITATION LIST

Patent Literature

PTL 1: JP-A. 2016-015885
PTL 2: JP-A 2012-170172
PTL 3: JP-A 2012-110082
PTL 4: JP-A-2011-109839
PTL 5: Japanese Patent No. 4,876,568

SUMMARY OF INVENTION

Technical Problem

However, in the conventional rotating electrical machine disclosed in PTL 1, the aforementioned problem (1) occurs because the terminal block extends in the axial direction.

Further, in the conventional rotating electrical machines disclosed in PTL 2 to PTL 4, since an assembly direction conversion terminal block is arranged as a separate structure, the dimension of the entire rotating electrical machine in the radial direction becomes large and the aforementioned problem (2) occurs.

In addition, in the conventional rotating electrical machine disclosed in PTL 5, although the space in the axial direction is small, the cable protruding in the axial direction causes a problem in the space in the radial direction.

Moreover, when a water path of a water-cooled motor is formed between a transmission case and a motor generator case as in PTL 5, it is very difficult to use the radial direction of the motor for arranging the terminal block.

The invention has been made to solve the aforementioned problems, and an object of the invention is to obtain a rotating electrical machine which s suitable for space saving and is light in weight by minimizing the protruding amount of the terminal block in the axial direction and the radial direction.

Solution to Problem

A rotating electrical machine according to the invention includes a rotor; a stator having a core annularly arranged facing the outer peripheral surface of the rotor, a coil wound around the core and having a coil end formed protruding from an end surface in the axial direction of the core, and an insulator formed on the end surface in the axial direction of the core and insulating the core and the coil; a bus bar arranged on the outer peripheral side of the coil end of the stator, and a terminal block installed on the outer peripheral side of the bus bar for introducing an electric current from an external power source to the stator, and the insulator has a groove portion in which the bus bar is held, and a terminal block housing portion in which the terminal block is held.

Advantageous Effects of Invention

According to the rotating electrical machine of the invention, it is possible to obtain a rotating electrical machine which is suitable for space saving and is light in weight by minimizing the protruding amount of the terminal block in the axial direction and the radial direction. Moreover, it is possible to eliminate the fixing member of the terminal block to minimize the height in the radial direction and to reduce the number of parts.

DESCRIPTION OF EMBODIMENTS

Figure 1:
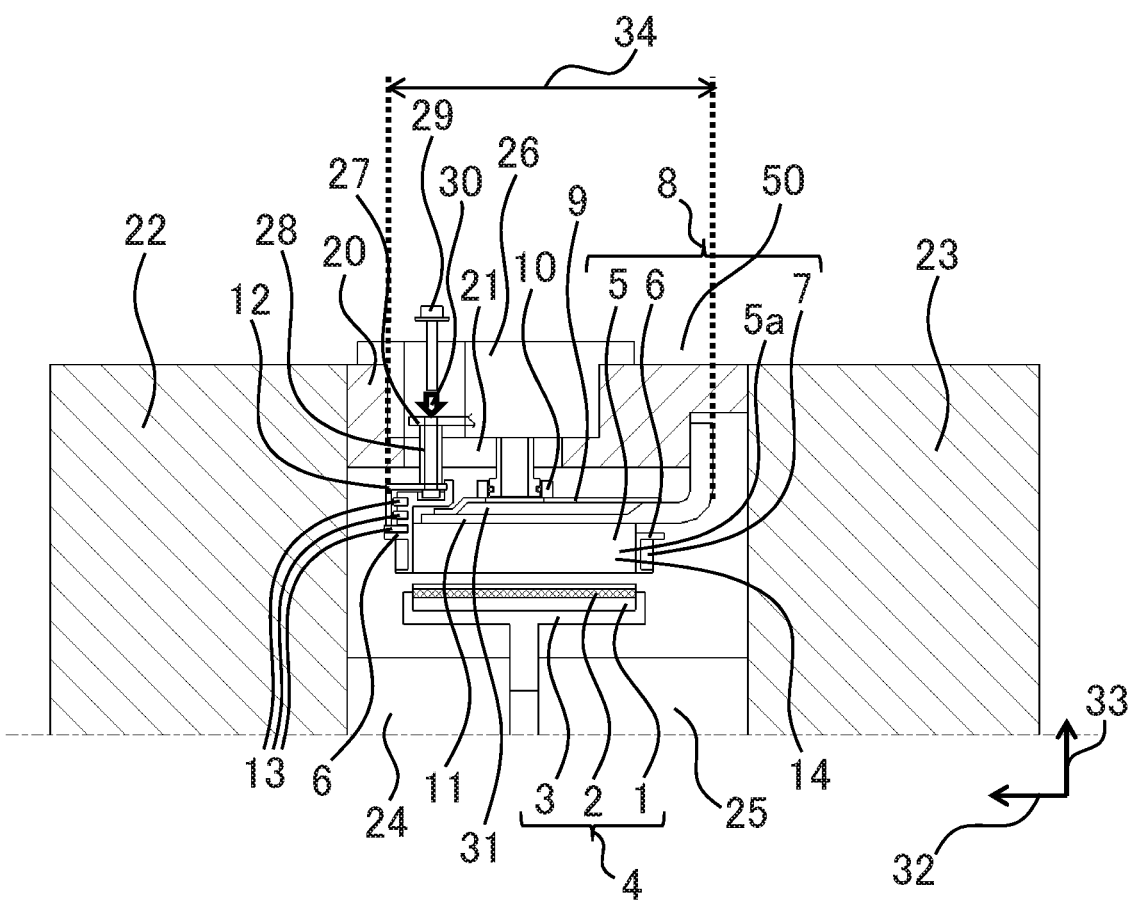
FIG. 1 is a schematic cross-sectional view of a state in which a rotating electrical machine according to Embodiment 1 of the invention is mounted on a vehicle.

Embodiment 1 of the invention will be described below with reference to the drawings.

In the drawings, the same reference signs indicate that they are the same or equivalent.

Embodiment 1

Figure 2:
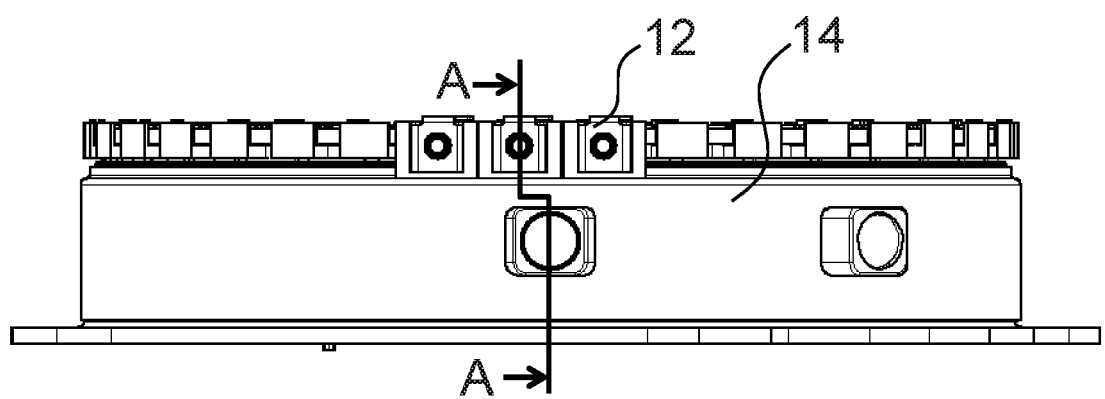
FIG. 2 is a side view of a stator side overall structure applied to the rotating electrical machine according to Embodiment 1 of the invention.

FIG. 1 is a schematic cross-sectional view of a state in which a rotating electrical machine according to Embodiment 1 of the invention is mounted on a vehicle. FIG. 2 is a side view of a stator side overcall structure applied to the rotating electrical machine according to Embodiment 1 of the invention. In FIG. 1, the part of stator side overall structure 14 shows a cross-sectional view along the line A-A in FIG. 2.

As shown in FIG. 1, a rotating electrical machine 50 includes a rotor 4 and the stator side overall structure 14. The rotor 4 includes a rotor iron core 1 formed by laminating a plurality of electromagnetic steel plates, a magnet 2 arranged and fixed in a through hole in which the rotor iron core 1 is provided, and a rotor boss 3 fitted and fixed to the inner periphery of the rotor iron core 1 and coupled with an external input and output shaft.

The stator side overall structure 14 of the rotating electrical machine 50 includes a stator 8 including a stator iron core 5 arranged on the outer peripheral side of the rotor 4 and formed by laminating a plurality of electromagnetic steel plates, resin insulators 6 provided at both end portions of the stator iron core 5, a coil 7 wound around the stator iron core 5, and insulation paper (not shown in the drawings) arranged between the stator iron core 5 and the coil 7.

Further, the stator side overall structure 14 of the rotating electrical machine 50 includes a stator frame 11 in which the stator 8 formed in an annular shape is press-fitted and to which a stay 10 for connecting a water jacket 9 and an external nipple is welded and fixed in the outer peripheral portion, and a cooling water path 31 is formed between the stator frame 11 and the water jacket 9.

In addition, the stator side overall structure 14 of the rotating electrical machine 50 includes a terminal block 12 which introduces electric power from an external power source, and bus bars 13 which distribute the electric power received from the terminal block 12 to each divided core 5a of the stator 8. The divided cores 5a constitute the stator iron core 5 by being arranged in an annular shape.

Therefore, the stator side overall structure 14 of the rotating electrical machine 50 includes the stator 8, the stator frame 11, the terminal block 12, and the bus bars 13.

Figure 3:
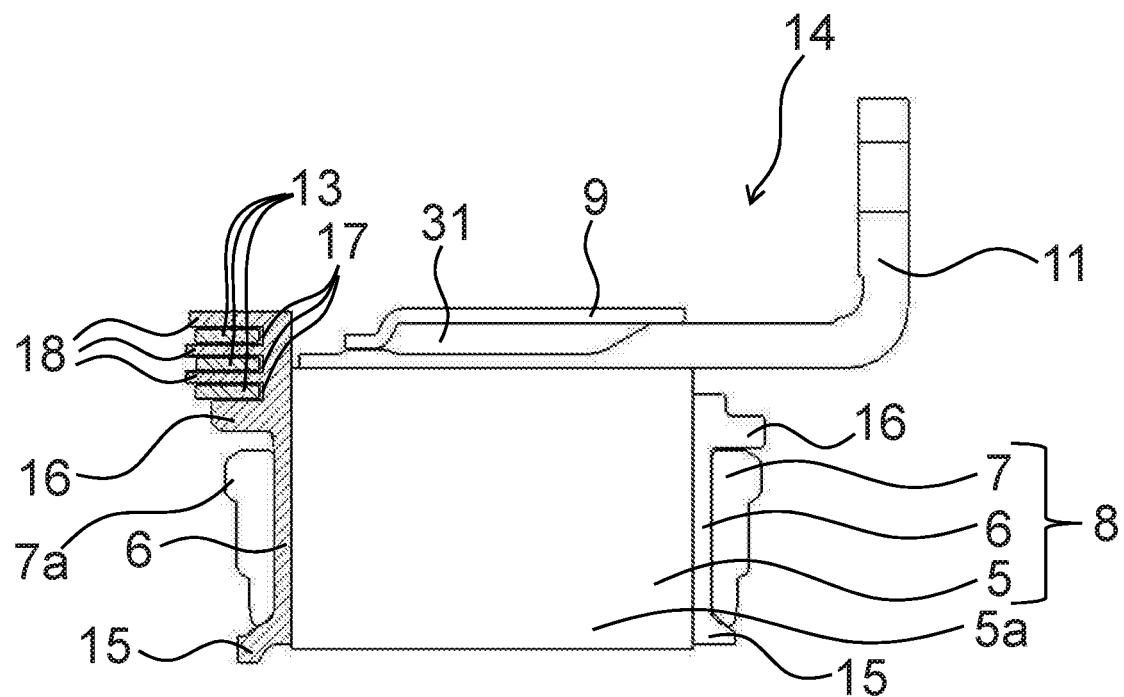
FIG. 3 is a cross-sectional view of the stator side overall structure applied to the rotating electrical machine according to Embodiment 1 of the invention.

FIG. 3 is a cross-sectional view of the stator side overall structure applied to the rotating electrical machine according to Embodiment 1 of the invention. Specifically, FIG. 3 is a cross-sectional view of the core 5a in the stator side overall structure 14 which does not have a terminal block housing portion 19, which is a fixation portion of the terminal block.

As shown in FIG. 3, the insulator 6 is provided with an inner peripheral side wall 15 and an outer peripheral side wall 16 defining a winding region of the coil 17. A groove portion 17 housing the bus bars 13 of each phase is provided on the further outer peripheral side in the radial direction 33 of the outer peripheral side wall 16 of at least one of the insulators 6 provided at both ends of the stator iron core 5. Specifically, in order to house three bus bars 13, the insulator 6 is provided with at least three groove portions 17. In addition, partition walls 18 of the bus bars 13 are provided in the insulator 6 in order to insulate each bus bar 13.

Figure 4:
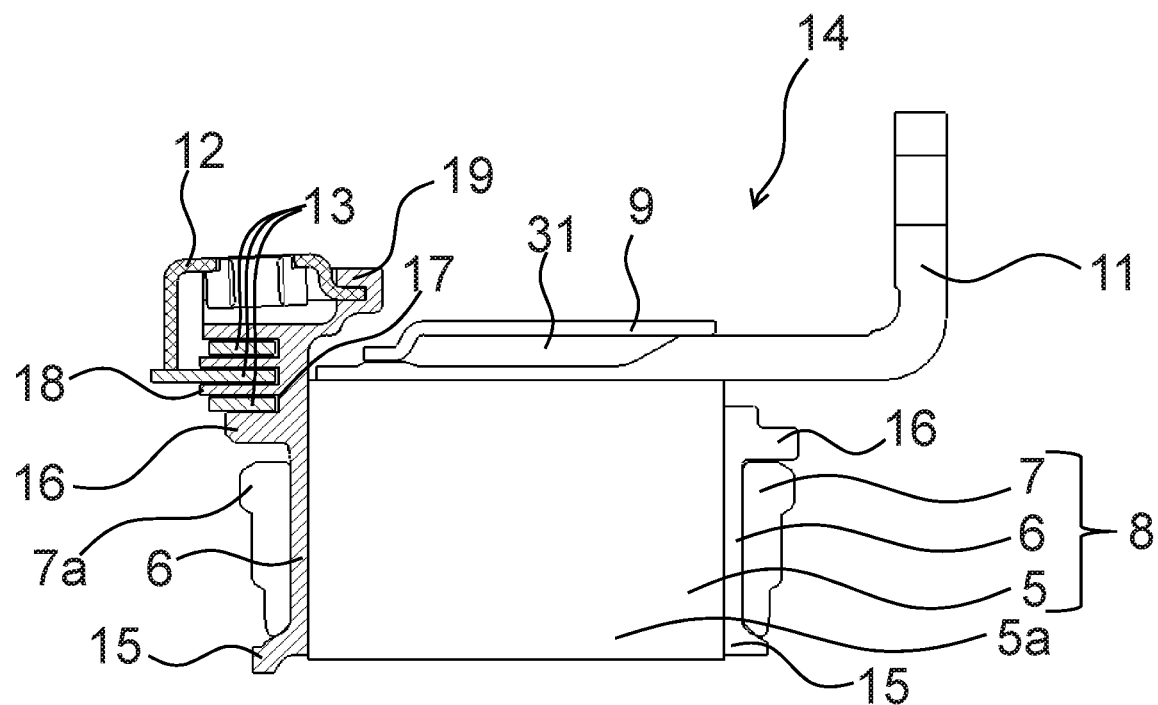
FIG. 4 is a cross-sectional view of the stator side overall structure applied to the rotating electrical machine according to Embodiment 1 of the invention.

FIG. 4 is a cross-sectional view of the stator side overall structure applied to the rotating electrical machine according to Embodiment 1 of the invention. Specifically, FIG. 4 is a cross-sectional view of core 5a n the stator side overall structure 14 which has the terminal block housing portion 19, which is a fixation portion of the terminal block. The terminal block 12 is installed on the outer peripheral side of the bus bars 13 corresponding to the three cores 5a among the cores 5a which are arranged in an annular shape. As shown in FIG. 4, the terminal block 12 is arranged in the terminal block housing portion 19 provided on the outer peripheral side of the groove portion 17 of the insulator 6.

Here, the insulator 6 which has the terminal block housing portion 19 is provided only on the divided cores 5a, on which the terminal block 12 is arranged, of the stator 8.

For example, the stator 8 has 36 cores 5a as the total number of the cores 5a, and three cores 5a among the 36 cores 5a are provided with the terminal block housing portion 19 housing the terminal block 12. Further, the terminal block housing portion 19 holding the terminal block 12 is arranged on the outer peripheral side of the bus bars 13.

The installation position of the terminal block 12 is arranged extending towards the center in the axial direction 32 from an end surface in the axial direction 32 of the rotating electrical machine 50, and the fastening portion provided on the terminal block 12 for fastening with an external power source is arranged to be accessible for a bolt 29 which is fastened from an outer side in the radial direction 33 of the rotating electrical machine 50.

As shown in FIG. 1, the rotating electrical machine 50 is housed in a motor housing 20 and is fastened and fixed to the motor housing 20 by a flange portion of the stator frame 11. A work window 21 is provided on the motor housing 20 such that the terminal block 12 can be seen when viewed from the radial direct on 33.

The rotating electrical machine 50 is arranged to be sandwiched between an internal combustion engine 22 and a transmission 23 of a vehicle, and an internal combustion engine output shaft. 24 of the internal combustion engine 22 and a transmission input shaft 25 of the transmission 23 are coupled via the rotor boss 3.

Further, an inverter 26 is attached to the motor housing 20 at a position on the outer side in the radial direction 33 of the rotating electrical machine 50. In addition, an inverter side AC bus bar 27 is fixed to the terminal block 12 of the rotating electrical machine 50 via a conductive spacer 23 using a bolt 29 from a terminal block bolt fastening direction 30 on the outer side in the radial direction 33.

Figure 5:
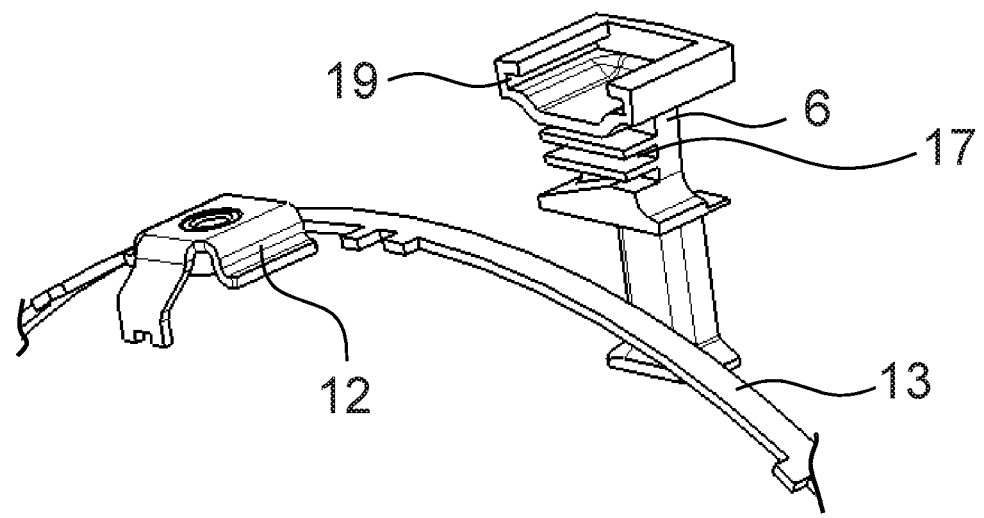
FIG. 5 is an exploded perspective view showing the periphery of an insulator of the stator side overall structure applied to the rotating electrical machine according to Embodiment 1 of the invention.
Figure 6:
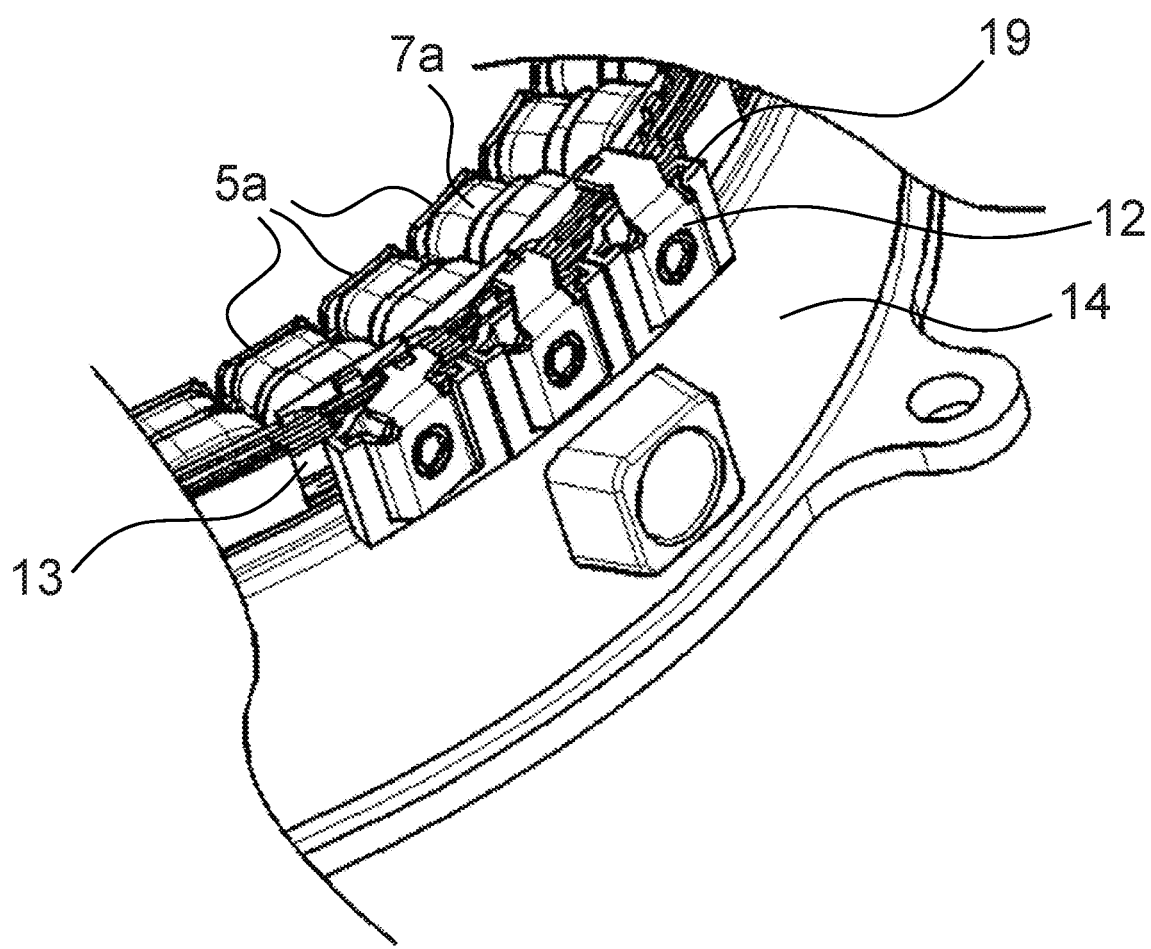
FIG. 6 is a perspective view of the stator side overall structure applied to the rotating electrical machine according to Embodiment 1 of the invention.

FIG. 5 is an exploded perspective view showing the periphery of the insulator of the stator side overall structure applied to the rotating electrical machine according to Embodiment 1 of the invention. FIG. 6 is a perspective view of the stator side overall structure applied to the rotating electrical machine according to Embodiment 1 of the invention. As shown in FIG. 5, the bus bar 13 is held in the groove portion 17 formed in the insulator 6, and the terminal block 12 is held in the terminal block housing portion 19 formed in the insulator 6. As shown in FIG. 6, the stator side overall structure 14 has a plurality of cores 5a. The terminal block housing portion 19, a structure in which the terminal block 12 is installed, is provided corresponding to three cores 5a in the plurality of cores 5a. The structure which holds the terminal block 12 is arranged on the outer peripheral side of the position where the bus bar 13 is housed.

The rotating electrical machine 50 according to Embodiment 1 of the invention has the stator 8 including a plurality of cores 5a arranged in an annular shape, coils 7 wound around each of the plurality of cores 5a, and insulators 6 insulating between the cores 5a and the coils 7 at both end surfaces in the axial direction 32 of each of the plurality of cores 5a.

Further, the rotating electrical machine 50 includes the stator frame 11 which has a cylindrical shape. The stator frame 11 has a cylindrical portion fitted to the outer peripheral side of the stator 8 which is formed in an annular shape, and a fixation portion at one end of the cylindrical portion, the fixation portion being fastened to the motor housing 20 houses the rotating electrical machine 50 to fix the stator 8 in a cantilever manner.

Moreover, the rotating electrical machine 50 has the rotor 4 which includes the rotor iron core 1 rotatably arranged on the inner peripheral side of the stator 8 and having a through hole in the axial direction 32, a plurality of magnets 2 (permanent magnets) disposed in housing holes formed at substantially equal intervals in the circumferential direction of the rotor iron core 1, and the rotor boss 3 holding the rotor iron core 1. In addition, in the rotating electrical machine 50 according to Embodiment 1 of the invention, the annularly shaped bus bars 13 which distribute an electric current to the coils 7 are arranged on the outer peripheral side of the coil end 7a of the stator 8. The bus bars 13 are held by the groove portions 17 extending from the insulator 6 and formed integrally with the insulator 6. Further, a plurality of the insulators 6 among the insulators 6 are provided with the terminal block housing portion 19 housing the terminal block 12 which connects the bus bars 13 and the inverter 26 in a manner that bolt-fastening is possible. The bolt fastening position is on the outer peripheral side of the stator frame 11, and bolt fastening direction is from the outer side of the radial direction 33.

Therefore, the rotating electrical machine 50 according to Embodiment 1 of the invention can be arranged in the limited space sandwiched between the internal combustion engine 22 and the transmission 23. In other words, it is possible to arrange the rotating electrical machine 50 at a position to be sandwiched between power transmission paths. This is because the rotating electrical machine 50 sandwiched between the internal combustion engine 22 and the transmission 23 has no front and rear spaces in the axial direction 32 and the connection with the inverter 26 is performed in the outer peripheral region of the stator 8. In Embodiment 1 of the invention, the insulator 6 has the function of holding the bus bars 13 and the terminal block 12 and the insulator 6, the bus bars 13, and the terminal block 12 are formed integrally, and thus the connection point with the inverter 26 can be configured with the minimum height in the outer peripheral region of the stator 8.

In this way, the insulator 6 can have the function of a connection board bus bar holding member, and it is possible to reduce the number of parts and to reduce the weight. In addition, among the insulators 6, three insulators 6 further have the function of holding the terminal block 12. By integrating the terminal block 12 with the insulators 6, the number of parts can be reduced.

In another cooling water path configuration as a comparative example, there is a water path sealed with an o ring or the like between the outer periphery of the stator frame and a casing. However, in this configuration as a comparative example, there is a problem that the outer peripheral region of the stator frame cannot be used for a configuration other than the water path.

However, in Embodiment 1 of the invention, the cooling water path 31 is constituted by the stator frame 11 and the water jacket 9 welded and fixed to the stator frame 11, and thus the terminal block 12 can be arranged on the outer peripheral side of the stator frame 11. In other words, in Embodiment 1 of the invention, the terminal block 12 may be arranged using the outer peripheral side of the water jacket structured water path. Therefore, the terminal block 12 can be formed within the range of the length 34 in the axial direction of the motor structure.

Further, in Embodiment 1 of the invention, the terminal block housing portion 19, which is the Fixation portion of the terminal block 12, is integrated with the insulator 6, and thus a fixing member for fixing the terminal block 12 to the stator frame 11 or the water jacket 9 is not needed.

Since it is unnecessary to use a fixing member for fixation to the stator frame 11, the water jacket 9 can be arranged to the maximum length in the axial direction of the stator frame 11.

Moreover, since it is unnecessary to use a fixing member for fixation to the water jacket 9, the thickness of the water path can be maximized without increasing the maximum diameter of the rotating electrical machine 50 which is determined by the apex of the terminal block as compared with the case where the terminal block 12 is placed on the water jacket 9, and it is possible to improve the cooling performance, to reduce the size and weight of the rotating electrical machine 50, and to reduce the number of parts.

Furthermore, as shown in Embodiment 1 of the invention, the conductor member of the terminal block 12 is held by the insulator 6, and by constituting the conductor member of the terminal block 12 as a member separate from the bus bars 13, material utilization of the bus bars 13 and the terminal block 12 can be improved in this way, the accuracy of the position of each of the bus bars 13 and the terminal block 12 can be enhanced.

The rotating electrical machine 50 according to Embodiment 1 of the invention has a structure in which the terminal block 12 is arranged within the range of the length 34 in the axial direction of the motor structure and protruding portions in the axial direction 32 caused by the terminal block 12 are eliminated. Moreover, by integrating the fixation of the terminal of the terminal block 12 with the insulator 6 of the coil 7, it is possible to eliminate the fixing member of the terminal block 12 to minimize the height in the radial direction 33 and to reduce the number of parts.

Furthermore, by orienting the bolt fastening direction of the terminal block 12 to the outer side in the radial direction 33, there is an effect that it is possible to arrange the configuration of the terminal block 12 including a fastening tool access within the range of the length 34 in the axial direction of the motor structure.

In the invention, embodiments can be appropriately modified or omitted within the scope of the invention.

REFERENCE SIGNS LIST

1: rotor iron core, 2: magnet, 3: rotor boss, 4: rotor, 5: stator iron core, 5a: core, 6: insulator, 7: coil, 7a: coil end, 8: stator, 9: water jacket, 10: stay, 11: stator frame, 12: terminal block, 13: bus bar, 14: stator side overall structure, 15: inner peripheral side wall, 16: outer peripheral side wall, 17: groove portion, 18: partition wall, 19: terminal block housing portion, 20: motor housing, 21: work window, 22: internal combustion engine, 23: transmission, 24: internal combustion engine output shaft, 25: transmission input shaft, 26: inverter, 27: inverter side AC bus bar, 28: spacer, 29: bolt, 30: terminal block bolt fastening direction, 31:

cooling water path, 32: axial direction, 33: radial direction, 34: length in axial direction of motor structure, 50: rotating electrical machine.

The invention claimed is:

1. A rotating electrical machine, including:
   a rotor;
   a stator having a core annularly arranged facing the outer peripheral surface of the rotor, a coil wound around the core and having a coil end formed protruding from an end surface in an axial direction of the core, and an insulator formed on the end surface in the axial direction of the core and insulating the core and the coil;
   a bus bar arranged on the outer peripheral side of the coil end of the stator; and
   a terminal block installed on the outer peripheral side of the bus bar for introducing an electric current from an external power source to the stator, the terminal block extending in the axial direction with respect to the stator,
   wherein the insulator having a groove portion in which the bus bar is housed, and a terminal block housing portion in which the terminal block is housed,
   wherein the terminal block extending in the axial direction is bent and extends in a radial direction toward a center of the stator to overlap with the bus bar and has an L shape when viewed from a circumferential direction, and
   wherein the terminal block housing portion is arranged on the outer peripheral side of a position where the bus bar is housed.

2. The rotating electrical machine according to claim 1, wherein the groove portion and the terminal block housing portion are respectively formed integrally with the insulator.

3. The rotating electrical machine according to claim 2, wherein
   the rotating electrical machine has a stator frame including a cylindrical portion having a cylindrical shape and fitted to the outer peripheral side of the stator, and a fixation portion provided at one end of the cylindrical portion for fixing the stator,
   the terminal block and the external power source are fixed by a bolt, and
   a fastening position of the bolt is on the outer peripheral side of the stator frame, and the bolt is fastened from an outer side in the radial direction.

4. The rotating electrical machine according to claim 3, wherein
   the rotating electrical machine has a water jacket welded to the outer periphery of the stator frame, and
   a water path is constituted by the stator frame and the water jacket.

5. The rotating electrical machine according to claim 4, wherein the terminal block is arranged within a range of the length in the axial direction of a motor structure including the rotor, the stator, and the stator frame.

6. The rotating electrical machine according to claim 3, wherein the terminal block is arranged within a range of a length in the axial direction of a motor structure including the rotor, the stator, and the stator frame.

7. The rotating electrical machine according to claim 1, wherein
   the rotating electrical machine has a stator frame including a cylindrical portion having a cylindrical shape and fitted to the outer peripheral side of the stator, and a fixation portion provided at one end of the cylindrical portion for fixing the stator,
   the terminal block and the external power source are fixed by a bolt, and
   a fastening position of the bolt is on the outer peripheral side of the stator frame, and the bolt is fastened from an outer side in the radial direction.

8. The rotating electrical machine according to claim 7, wherein
   the rotating electrical machine has a water jacket welded to the outer periphery of the stator frame, and
   a water path is constituted by the stator frame and the water jacket.

9. The rotating electrical machine according to claim 8, wherein the terminal block is arranged within a range of a length in the axial direction of a motor structure including the rotor, the stator, and the stator frame.

10. The rotating electrical machine according to claim 7, wherein the terminal block is arranged within a range of the length in the axial direction of a motor structure including the rotor, the stator, and the stator frame.

11. The rotating electrical machine according to claim 1, wherein the terminal block is a conductor member, and is constituted as a separate member from the bus bar.

12. The rotating electrical machine according to claim 1, wherein the rotating electrical machine is installed at a position sandwiched between an internal combustion engine and a transmission of a vehicle.

* * * * *